(12) United States Patent
Deb et al.

(10) Patent No.: US 8,102,837 B2
(45) Date of Patent: *Jan. 24, 2012

(54) NETWORK CODING APPROACH TO RAPID INFORMATION DISSEMINATION

(75) Inventors: Supratim Deb, Cambridge, MA (US); Muriel Medard, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 1374 days.

This patent is subject to a terminal disclaimer.

(21) Appl. No.: 11/026,483

(22) Filed: Dec. 30, 2004

(65) Prior Publication Data

US 2006/0146791 A1 Jul. 6, 2006

(51) Int. Cl.
H04L 12/66 (2006.01)
(52) U.S. Cl. ....... 370/352; 709/217; 709/232; 370/432; 379/399.02
(58) Field of Classification Search .......... 370/352; 709/223–240
See application file for complete search history.

(56) References Cited

U.S. PATENT DOCUMENTS

| | | | | |
|---|---|---|---|---|
| 5,924,060 | A * | 7/1999 | Brandenburg | 704/200 |
| 6,370,389 | B1 * | 4/2002 | Isomursu et al. | 455/466 |
| 7,174,385 | B2 * | 2/2007 | Li | 709/231 |
| 2004/0054807 | A1 * | 3/2004 | Harvey et al. | 709/243 |
| 2004/0111390 | A1 * | 6/2004 | Saito et al. | 707/1 |
| 2005/0283537 | A1 * | 12/2005 | Li et al. | 709/240 |
| 2006/0007947 | A1 * | 1/2006 | Li et al. | 370/432 |
| 2006/0053209 | A1 * | 3/2006 | Li | 709/217 |
| 2006/0069800 | A1 * | 3/2006 | Li | 709/232 |
| 2006/0080454 | A1 * | 4/2006 | Li | 709/231 |
| 2006/0146791 | A1 * | 7/2006 | Deb et al. | 370/352 |

OTHER PUBLICATIONS

S. Deb, M Medard, and C. Choute. Alegbraic Gossip: A Network Coding Approach to Rapid Information Dissemination. MIT Technology Disclosure. Aug. 26, 2004.*
Deb, S. et al., Algebraic Gossip: A Network Coding Approach to Optimal Multiple Rumor Mongering. Submitted to IEEE Transactions on Information Theory, Apr. 2004. pp. 1-10.*
Deb S. et al., Data Harvesting: A Random Coding Approach to Rapid Dissemination and Efficient Storage of Data, 2005, Proceedings of the 2005 International Symposium on Network Coding, pp. 1-12.*
Rudolf Ahlswede, et al., "Network Information Flow", IEEE Transactions on Information Theory, vol. 46, No. 4, Jul. 2000, pp. 1204-1216.
Ashwinder Ahluwalia, et al., "On the Complexity and Distributed Construction of Energy-Efficient Broadcast Trees in Static Ad Hoc Wireless Networks", In Proceedings. 2002 Conference on Information Sciences and Systems (CISS 2002), Mar. 2002, pp. 807-813.

(Continued)

*Primary Examiner* — Fan Tsang
*Assistant Examiner* — Ibraham Sharifzada
(74) *Attorney, Agent, or Firm* — Chapin IP Law, LLC; David W. Rouille

(57) ABSTRACT

A method, apparatus and computer program product for providing rapid information dissemination using network coding is presented. A coded message including a payload and a code vector, is transmitted from a first node of the network to a second node of the network. The information thus stored can also be retrieved by collecting code vectors from at least one node and viewing the collected code vectors as a matrix. A determination is made regarding whether a dimension of the matrix is equal to a predefined number. When the dimension of the matrix equals the predefined number, the information is retrieved using the collection of code vectors in the matrix.

22 Claims, 9 Drawing Sheets

OTHER PUBLICATIONS

Ning Cai, et al., "Secure Network Coding", In Proceedings. 2002 IEEE International Symposium on Information Theory, Jun. 30-Jul. 5, 2002, p. 323.

Philip A. Chou, et al., "Practical Network Coding", In Proceedings. $41^{st}$ Annual Allerton Conference on Communication, Control and Computing, Oct. 2003, pp. 40-49.

Alan Demers, et al., "Epidemic Algorithms for Replicated Database Maintenance", In Proc. ACM Symposium on Principles of Distributed Computing, 1987, pp. 1-12.

Michelle Effros, "Distortion-Rate Bounds for Fixed-and Variable-Rate Multiresolution Source Codes", IEEE Transactions on Information Theory, vol. 45, No. 6, Sep. 1999, pp. 1887-1910.

Tracey Ho, et al., "On Randomized Network Coding", In Proc. $41^{st}$ Annual Allerton Conference on Communication, Control and Computing, Oct. 2003, pp. 11-20.

Tracey Ho, et al., "Byzantine Modification Detection in Multicast Networks Using Randomized Network Coding", ISIT 2004, Chicago, USA, Jun. 27-Jul. 2, 2004, p. 144.

Tracey Ho, et al., "The Benefits of Coding Over Routing in a Randomized Setting", ISIT 2003, Yokohama, Japan, Jun. 29-Jul. 4, 2003, p. 442.

R. Karp, et al., "Randomized Rumor Spreading", In Proc. Foundations of Computer Science, 2000. pp. 565-574.

David Kempe, et al., "Protocols and Impossibility Results for Gossip-Based Communication Mechanisms", In Proc. $43^{rd}$ IEEE Symposium on Foundations of Computer Science, 2002. pp. 471-480.

Ralf Koetter, et al., "An Algebraic Approach to Network Coding", IEEE/ACM Transactions on Networking, vol. 11, No. 5, Oct. 2003. pp. 782-795.

Kadaba Bharath-Kumar, et al., "Routing to Multiple Destinations in Computer Networks", IEEE Transactions on Communications, vol. Com-31, No. 3, Mar. 1983, pp. 343-351.

April Rasala Lehman, et al., "Complexity Classification of Network Information Flow Problems", In Proc. $41^{st}$ Annual Allerton Conference on Communication, Control and Computing, Oct. 2003, pp. 9-10.

Muriel Medard, et al., "On Coding for Non-Multicast Networks", In Proc. $41^{st}$ Annual Allerton Conference on Communication, Control and Computing, Oct. 2003, pp. 21-29.

S. Ramanathan, "Multicast Tree Generation in Networks With Asymmetric Links", IEEE/ACM Transactions on Networking, vol. 4, No. 4, Aug. 1996, pp. 558-568.

Tim Roughgarden, et al., "How Bad Is Selfish Routing?", Journal of the ACM, vol. 49, No. 2, Mar. 2002, pp. 236-259.

Scott Shenker, et al., "Pricing in Computer Networks: Reshaping the Research Agenda", Telecommunications Policy, vol. 20, No. 3, 1996, pp. 183-201.

Hanif D. Sherali, et al., "Recovery of Primal Solutions When Using Subgradient Optimization Methods to Solve Lagrangian Duals of Linear Programs", Operations Research Letters 19 (1996), pp. 105-113.

Luhua Song, et al., "Zero-Error Network Coding for Acyclic Networks", IEEE Transactions on Information Theory, vol. 49, No. 12, Dec. 2003, pp. 3129-3139.

Shuo-Yen Robert Li, et al, "Linear Network Coding", IEEE Transactions on Information Theory, vol. 49, No. 2, Feb. 2003, pp. 371-381.

Jeffrey E. Wieselthier, et al., "Energy-Aware Wireless Networking with Directional Antennas: The Case of Session-Based Broadcasting and Multicasting", IEEE Trans. On Mobile Computing, vol. 1, No. 3, Jul.-Sep. 2002, pp. 176-191.

Jeffrey E. Wieselthier, et al., "Energy-Efficient Broadcast and Multicast Trees in Wireless Networks", Mobile Networks and Applications 7, 2002, pp. 481-492.

Raymond W. Yeung, "Multilevel Diversity Coding with Distortion", IEEE Transactions on Information Theory, vol. 41, No. 2, Mar. 1995, pp. 412-422.

\* cited by examiner

NETWORK CODING APPROACH TO RAPID INFORMATION DISSEMINATION

STATEMENT REGARDING FEDERALLY SPONSORED RESEARCH

This invention was made with government support under Grant Nos. BES-0094715 and ANI-0121662, awarded by NSF. THe government has certain rights in the invention.

BACKGROUND

Information technology has the broad aim of providing anytime-anywhere communication and computation. There are four key aspects considered for reaching the goal: communication, computation, storage, and security. The recent growth of distributed systems has necessitated design of techniques that consider some of these issues jointly, rather than each in an isolated manner.

Distributed systems typically are realized in one of two different scenarios: point-to-point and point-to-multipoint. For these systems, gossip based protocols are a very robust. In gossip based protocols, nodes can communicate with only one of its neighbors at a time. The communicating neighbor is typically chosen at random. In gossip-based communication, there is no centralized controller and every node in the network acts simply based on state or information of the node, and not that of the over all network. Thus, gossip based protocols are inherently distributed and readily implementable.

SUMMARY

Conventional mechanisms of message dissemination suffers due to a transmitting node's lack of knowledge about the demands of the recipient node. Such deficiency is more significant in systems where the bandwidth available between two communicating nodes may be limited, and further, each node only has knowledge about its own contents. Thus, messages are typically transmitted one after the other, instead of disseminating them sequentially.

Embodiments of the invention significantly overcome such deficiencies and provide mechanisms and techniques that provide a network coding approach to rapid information dissemination by disseminating information/messages simultaneously.

In a particular embodiment of a method using network coding to provide rapid information dissemination, the method includes transmitting, from a first node of the network to a second node of the network, a message that includes the payload and an associated code-vector.

Other embodiments include a computer readable medium having computer readable code thereon for providing rapid information dissemination using network coding. The medium includes instructions for transmitting, from a first node of the network to a second node of the network, a message including a payload. The medium further includes instructions for transmitting, from the first node to the second node of the network, a random coding vector with the message.

Still other embodiments include a computerized device, configured to process all the method operations disclosed herein as embodiments of the invention. In such embodiments, the computerized device includes a memory system, a processor, a communications interface and an interconnection mechanism connecting these components. The memory system is encoded with a process that provides a network coding approach to rapid information dissemination as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a network coding approach to rapid information dissemination as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
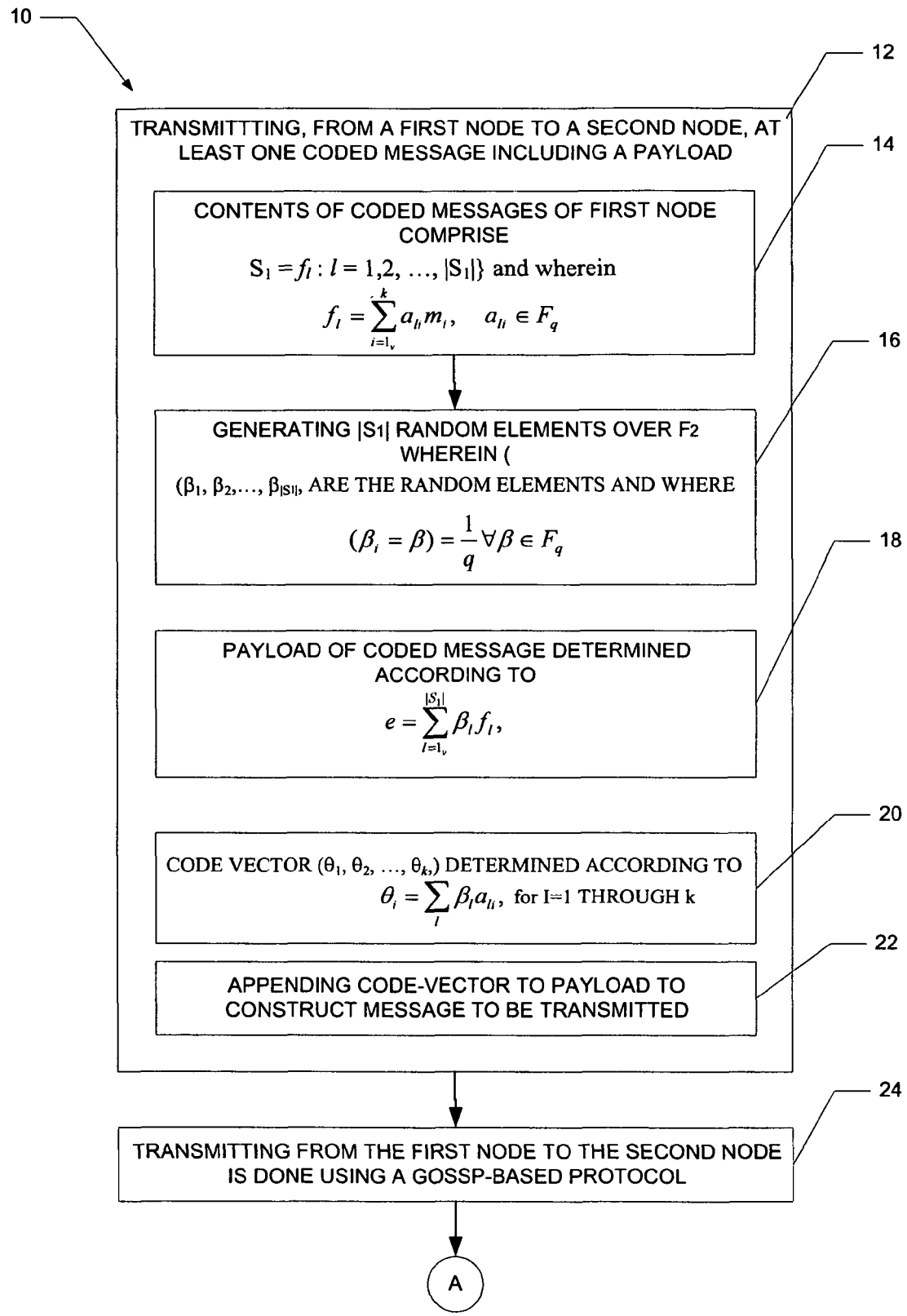
FIG. 1 is a flow diagram of a particular embodiment of a method using a network coding approach for providing rapid information dissemination.

Random Linear Coding (RLC) is used to develop efficient protocols for disseminating information in distributed systems. It is desirable to disseminate information rapidly in a distributed environment in a decentralized manner. Appropriate algorithms for this can enhance the power of distributed computation in various systems.

A network includes n nodes and there are k distinct messages to start with. The term message as used herein to mean either true messages, updates, pieces of a large file, or a collection of small files depending on the application. The goal is to disseminate all the k messages among all the nodes. The messages are all of equal size m. A discrete-time model is used. In each time-step, a single message is transmitted between two communicating nodes. The underlying communication model can be point-to-point or point-to-multipoint.

In a gossip based point-to-point communication, there are n nodes in the system. V denotes the set of nodes. Each node $u \in V$ has a fixed set of $d(u) \subset V$ neighbors it can communicate with. Thus, the communicating nodes form a directed graph G. A discrete-time model is used so that time is divided into slots, also referred to as rounds. The beginning and the end of the slots are synchronized at the various nodes. In gossip based communication, at the beginning of each slot, every node $v \in V$ calls a communication partner $u \in d(v)$ uniformly at random from its set of neighbors $d(u)$, and transmits (receives) information to (from) the called partner u. The bandwidth is limited, in the sense that, in each round, the amount of information that can be exchanged is around m bits, which is also the size of each message. If the bandwidth available is more or less than m, the messages can be combined or divided so that each message roughly corresponds to what can be transmitted in one slot. There are two variants of gossip, namely push and pull. In a push based scheme, if v calls a node u, then information is transmitted from v to u. In a pull based model, if v calls u, information is transmitted from u to v.

The other communication model considered is point-to-multipoint communication, which is more suitable for wireless environments. In a point-to-multipoint environment there are n nodes located in a geographic area. Each node has a communicating radius, so that, every transmission by a node can be received by all the nodes located in the given communication radius. Thus, for a given communication radius, each node has a set of neighbors and transmissions are received by all the neighbors.

A protocol known as random linear coding (RLC) is used for simultaneously disseminating multiple messages in a system. The protocol is employed whenever a participating node transmits a message.

The messages are vectors over the finite field, Fq of size q. If the message size is m bits, this is done by viewing each message as a $r = \lceil m/\log_2(q) \rceil$ dimensional vector over Fq (instead of viewing each message as a m dimensional vector over the binary field). To this end, $m_i \in F_q^r$ ($m_i$, i=1,2, ... k, are the messages) for some integer r. Thus, the messages are over a vector space with the scalars in Fq. All the additions and the multiplications in the following description are assumed to be over Fq.

In the RLC protocol, the nodes start collecting several linear combinations of the messages in M The nodes collect code-vectors, and thus they build up the dimension of the sub-space spanned by the received code-vectors. In the discussion of the RLC protocol, the "dimension of the subspace spanned by the code-vectors received by the node" is also referred to as the "dimension of a node" or "rank of a node."

Once there are k independent linear combinations with a node, it can recover all the messages successfully. $S_v$ denotes the set of all the coded message (each coded message is a linear combination of the messages in M) with node v at the beginning of a round. More precisely, let for each $f_l \in S_v$, where $l=1,2 \ldots |S_v|$, $f_l \in F_q^r$ have the form $$f_l = \sum_{i=1}^{k} a_{li} m_i, \quad a_{li} \in F_q$$

Further the protocol ensures that $a_{li}$'s are known to v. This can be done with a minimal overhead with each packet.

Now, if the node v has to transmit a message to u, then v transmits a "random" coded message with payload $e \in F_q^r$ to u, where $$e = \sum_{f_l \in S_v}^{k} \beta_l f_l, \quad \beta_l \in F_q \quad (1)$$

and $$Pr(\beta_i = \beta) = \frac{1}{q}, \forall \beta \in F_q \quad (2)$$

For decoding purposes, the transmitting nodes also sends the "random coding vectors" as overhead with each packet. The code vector is denoted by $(\theta_1, \theta_2, \ldots, \theta_k)$ where $$\theta_i = \sum_l \beta_l a_{li}.$$

This can be achieved by padding an additional $k \log_2 q$ bits with each message. To see the precise structure of the overhead associated with a packet, note that the payload part of the transmitted message e in (1) can be represented as follows:

$$e = \sum_{f_l \in S_v}^{k} \beta_l f_l,$$

$$= \sum_{f_l \in S_v}^{k} \beta_l \sum_{i=1}^{k} a_{li} m_i = \sum_{i=1}^{k} \theta_i m_i (\text{where } a_{li} \in F_q)$$

It is the $\theta_i$'s that are sent as overhead with the transmitted messages. Thus, once the $\beta_i$'s are decided in randomized manner according to equation (2), the transmitting nodes can precisely obtain the values of $\theta_i$'s (i=1,2 . . . k) and send as overhead. This lo overhead requires a padding of additional k $\log_2$ (q) bits. The overhead $(\theta_1,\theta_2, \ldots \theta_k) \in F_q^k$, is called the transmitted "code-vector." The nodes collect code-vectors. The collected code-vectors form a matrix. Once the dimension of the matrix (i.e., the dimension of the sub-space spanned by the received "code-vectors") is equal to k, all the messages can be recovered.

If there are k messages to be disseminated, the RLC protocol would require an overhead of k $\log_2$ (k) bits if the field size is chosen as q≈k (this is typically sufficient as will be described later). The RLC protocol is thus useful if the message size m satisfies m>>k $\log_2$ (q). In various scenarios this may indeed be the case. Suppose the maximum number of messages that can be present at a time is 50. Then the maximum value of the overhead is roughly 50 $\log_2$ (50) bits or equivalently around 40 bytes. If each message is of size 1 KB (equivalently the bandwidth available for point-to-point transmissions), then the overhead is 4%, and if each message is around 100 KB, then the overhead is less than 0.05%.

The RLC protocol does not depend on the underlying communication model. The protocol can be applied to any environment where multiple messages are to be simultaneously disseminated over a bandwidth limited environment. However, the performance of the protocol will depend on the underlying communication model.

The field size q is a design parameter. Generally, a field size of q≈k suffices.

A non-coding based protocol for simultaneous data dissemination, called Random Message Selection or RMS is also discussed. In RMS, the nodes simply gather messages, and at every communication instant, any transmitting node chooses one of the messages from the collected ones uniformly at random for transmission. This is a natural protocol for transmission with uncoded messages.

Theoretical results for the special case of k=0(n) and when the underlying graph communication graph is fully connected are described. Such a model can be relevant in a distributed computing environment when multiple computers are connected to each other and they need to update each other about newly arriving messages.

There are n nodes and the neighbor set of every node is the entire set of nodes. Thus $d(v)=V \setminus \{v\}$ for every v C V. At the beginning of every step, every node calls any one of the nodes uniformly at random as its communication partner.

The first result in this case concerns the extreme case when the number of messages k is comparable to n. In other words, k=αn for a fixed α<1. Every message is equally spread to start with, i.e., every message lies at exactly n/k=1/α locations. This assumption is made for the ease of analytical exposition, and can be relaxed with little effort. A bandwidth limited environment is considered so that the size of the messages that can be transmitted in each round is roughly the size of one message. A scenario where the size of a message m is such that m>>k $\log_2$ (k) is also considered. The results reflect a push based communication model so that the transmission takes place from the caller node to the called node.

Using RLC with push, with k=0(n) and wherein the underlying communication graph is fully connected. $\overline{T}_{RLC}$ is the random variable denoting the time required by all the nodes to get all the messages using an RLC approach with the push mechanism. Then, $$\overline{T}_{RLC} = O(n), w.p. \ 1 - O\left(\frac{1}{n}\right)$$

Further, if $T_{RLC}$ is the time required for a particular node to get all the messages, then $$I\!E[T_{RLC}]=O(n).$$

A comparison of the RMS protocol in the same scenario is next. The following shows that RMS mechanism performs worse.

Using RMS with push, $T_{RMS}^{push}$ is the time required for all the nodes to get all the k messages using an RMS protocol with pull mechanism. Then, $$I\!E T_{RMS}^{push} = \Omega(n\ln n)$$

and $$\lim_{n\to\infty} Pr\bigl(T_{RMS}^{push} = \Omega(n\ln(n))\bigr) = 1$$

An explanation regarding why RLC does well and RMS does not follows. With RMS, the probability that a received message at a node is already an existing one, increases with the number of messages that are already there with the node. This is in sharp contrast to RLC. In RLC, the nodes build dimensions of the received code-vectors, referred to as rank of the node. The probability that the rank of a node increases does not depend on the value of the rank, but rather on the code-vectors of the node transmitting the message. The same results are obtained with a pull based scheme as well.

If no overheads are allowed, i.e., if the size of the transmission between any two communicating nodes is strictly limited to m (m is the size of a message), then it will take at least O(n) rounds for complete dissemination to occur when k=O(n). Any protocol which achieves this dissemination time is clearly order optimal. The RLC protocol achieves this optimal dissemination time at the cost of a small overhead for reasonably large message sizes. For example, with k=100, the overhead is 1% for m=100 KB and it is 0.1% for m=1 MB. The overhead does not grow with the size of the messages or available bandwidth and simply depends on the number of messages that are to be disseminated simultaneously.

In gossip based communication with one message, it takes θ(ln(n)) time for the complete dissemination to occur with high probability. Thus, if the k messages are disseminated sequentially one after the other, it will take θ(ln(n)) time to disseminate all the messages when k=O(n). The results shows that the uncoded RMS protocol can do no better than when the messages are disseminated one after the other.

Further, if there is no bandwidth constraint (i.e., if a transmitting node can transmit its entire database) between two communicating nodes, the dissemination time is simply θ(ln (n)) for any k. This is since the system behaves as if there is only one message for which the dissemination time is θ(ln (n)).

An interesting quantity is the total amount of information that is exchanged. If each message is of size m, the total amount of information exchanged in the RLC protocol is $O(n^2(m+k\log_2(k)))$. In the case of RMS, this quantity is at least $\Omega(n^2 \ln(n) (m+\log_2(k)))$ (additional $\log_2$ (k) bits for identifying each message). Further, any protocol will require at least $\Omega(n^2 m)$ bits of transmission.

The RLC protocol is almost order optimal for k=O(n). This does not provide an accurate idea of dissemination time for k=O(n). There are significant gains to be had by using RLC for small values of k.

Figure 2:
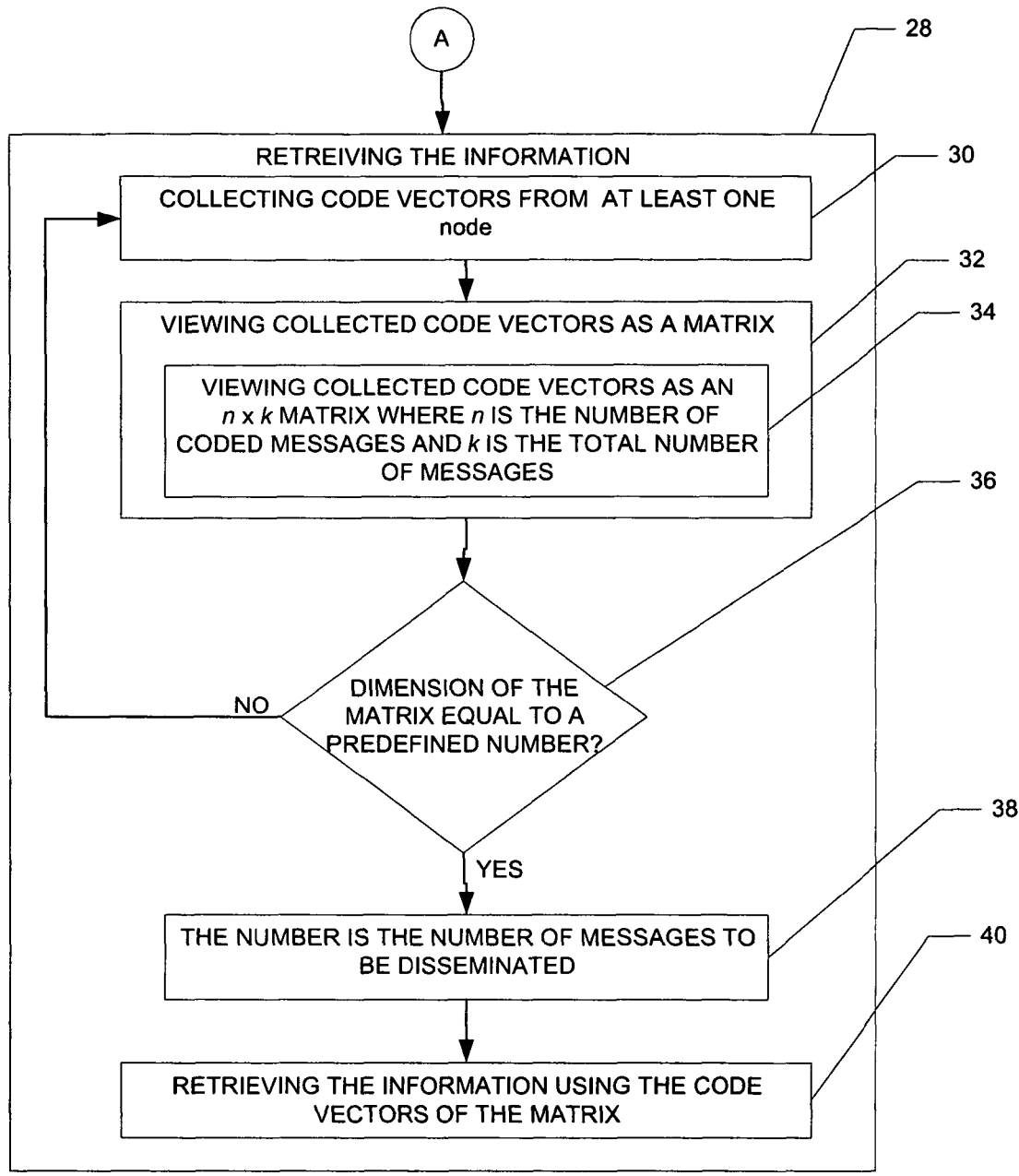
FIG. 2 is a flow diagram of a particular embodiment for retrieving a file previously stored by way of the method shown in FIG. 1.

Flow charts of the presently disclosed methods are depicted in FIGS. 1 and 2. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient, or desirable order.

Referring now to FIG. 1A a method 10 of method using network coding to provide rapid information dissemination is shown. The method 10 begins with processing block 12 wherein a coded-message has to be transmitted from a first node of the network to a second node of the network.

In processing block 14, the contents with the transmitting node is first accessed. The contents are the coded-messages (or possibly any un-coded message which the transmitting node has access to). The contents are denoted by the set $S_1 = \{f_l : l=1,2,3 \ldots, |S_1|\}$, where, $$f_l = \sum_{i=1_v}^{k} a_{li} m_i,$$

$\alpha_{li} \in F_q$. Here k is the number of messages, and $F_q$ is the field of size q.

In processing block 16, $|S_1|$ random elements of the field $\beta_1, \beta_2, \beta_3, \ldots, \beta_{|S_1|}$ are generated using the formula $$Pr(\beta_l = \beta) = \frac{1}{q} \forall \beta \in F_q$$

for l=1 through l=$|S_1|$.

In processing block 18, the payload, e, of the to-be-transmitted coded-message is determined according to the equation $$e = \sum_{l} \beta_l f_l$$

wherein $\beta_l$'s are determined in block 16.

In processing block 20, the code-vector, $(\theta_1, \theta_2, \ldots, \theta_k)$, associated with the to-be-transmitted message is determined according to $$\theta_i = \sum_{l} \beta_l a_{li}$$

for i=1 through i=k and the $\beta_l$'s aS determined in block 16.

In processing block 22, the code-vector $(\theta_1, \theta_2, \ldots, \theta_k)$ is appended with the payload e to form the complete to-be-transmitted message. The payload e is determined in block 18 and the code-vector $(\theta_1, \theta_2, \ldots, \theta_k)$ is determined in block 20.

In processing block 24, the complete to-be-transmitted message is transmitted from the first node to the second node using gossip-protocol. The message that is transmitted is determined in block 22.

The method using network coding to provide rapid information dissemination may further include the retrieving the information, as shown in FIG. 2. In processing block 28 the step of retrieving the information is shown.

As shown in processing block 30, retrieving the information includes collecting code vectors from at least one peer on the network. In processing block 32, the collected code vectors are viewed as a matrix. In a particular embodiment, shown in processing block 34, the collected code-vectors are viewed as a n×k matrix of $F_q$ wherein k is the number of messages to be simultaneously disseminated and n is the number of coded-messages collected so far. In decision block 36 a determination is made whether a dimension of the matrix is equal to a predefined number k which is also the number of messages that are simultaneously disseminated. When the dimension of the matrix does not equal the predefined number then processing continues with processing blocks 30 et. seq. When the dimension of the matrix equals the predefined number, then processing continues with processing blocks 38 et. seq.

In processing block 38, in a preferred embodiment, the predetermined number used in decision block 36 is equal to the number of pieces the file is broken into. In processing block 40, the information is retrieved using the code vectors of the matrix.

The performance of RLC protocol for various values of k and n, are shown in FIGS. 3A-7B. In all the simulations, there are k nodes that start with k distinct messages and all the other n−k nodes do not have any messages to start with. Also, q=k in all the cases.

Figure 3A:
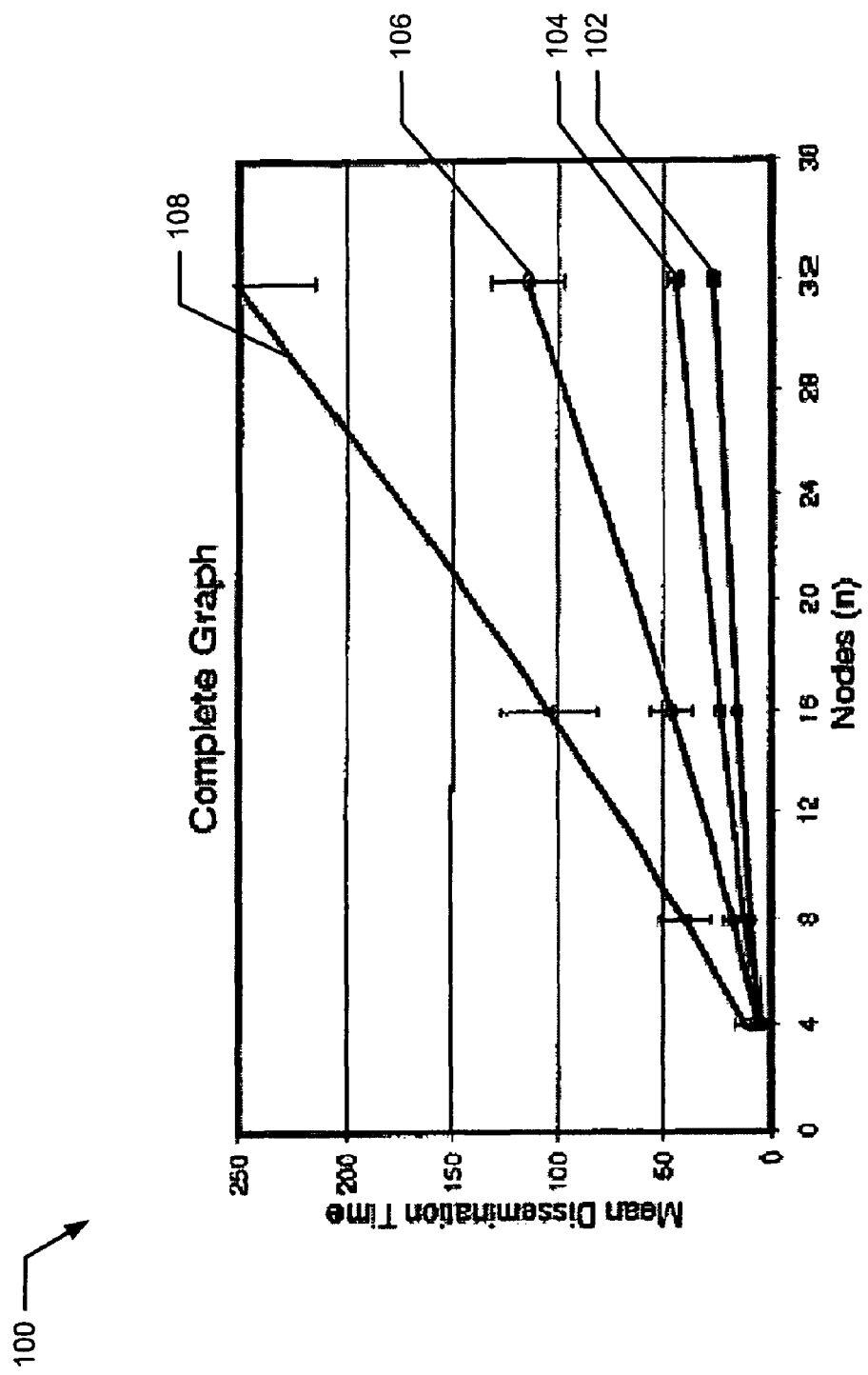
FIG. 3A is a plot showing the mean dissemination time using the present invention.

In FIG. 3A, the mean complete dissemination time with RLC and RMS protocol is shown. The mean is obtained by averaging the complete dissemination time (the time by which all the nodes get everything) over 100 runs. In the plot 100, the dissemination time varies with the number of nodes n, when the number of messages is k=n and k=n/2. Line 102 represents the RLC protocol with the number of messages equal to the number of nodes. Line 104 represents the RLC protocol with the number of messages equal to the number of nodes divided by 2. Line 106 represents the RMS protocol with the number of messages equal to the number of nodes. Line 108 represents the RMS protocol with the number of messages equal to the number of nodes divided by 2. The RLC protocol for message dissemination far outperforms the RMS protocol.

Figure 3B:
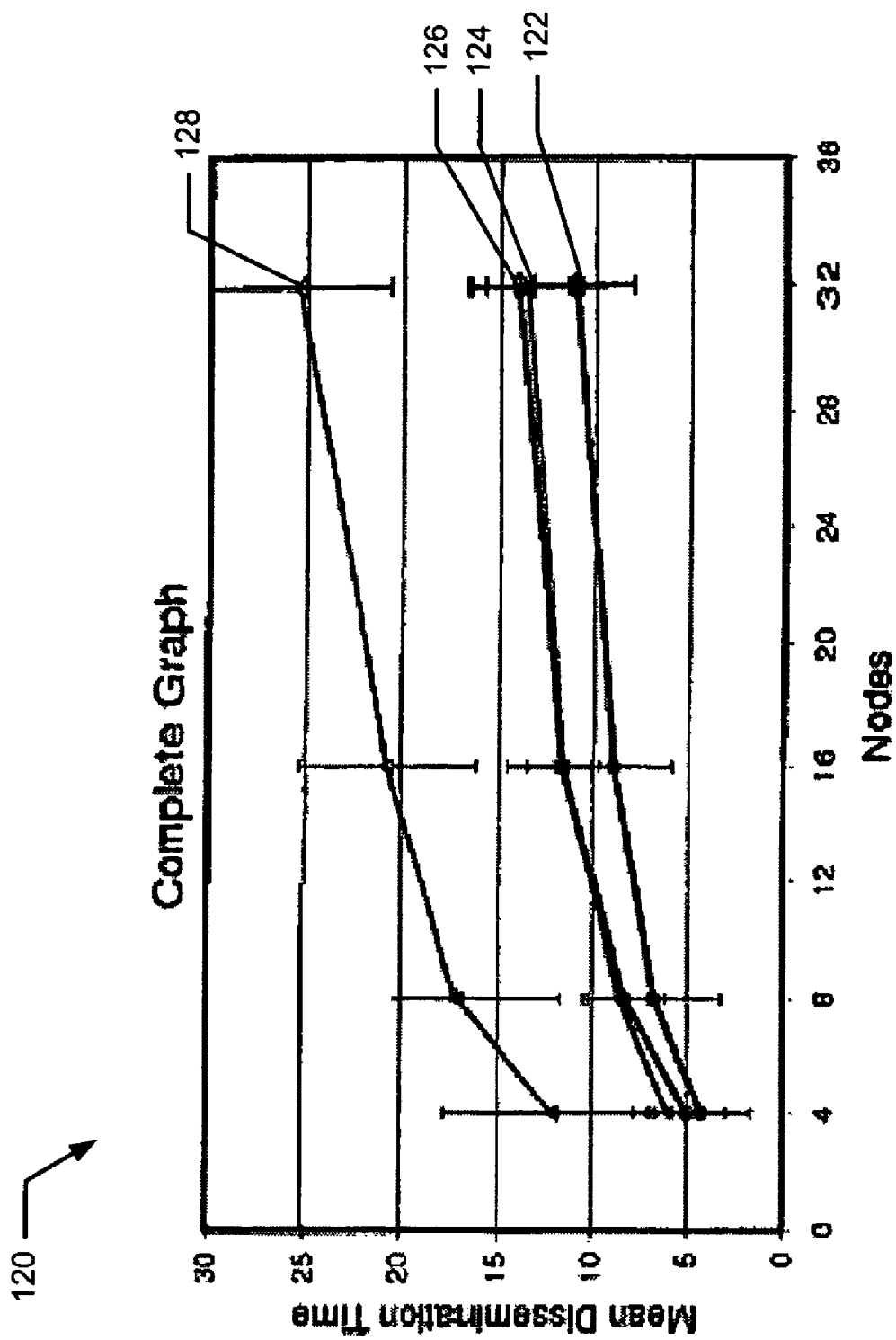
FIG. 3B is a plot showing the mean dissemination time using the present invention wherein the number of messages is fixed at a predetermined value.

In FIG. 3B, plots are shown when the number of messages k is fixed at two and at four. Line 122 represents the RLC protocol with the number of messages equal to 2. Line 124 represents the RLC protocol with the number of messages equal to 4. Line 126 represents the RMS protocol with the number of messages equal to 2. Line 128 represents the RMS protocol with the number of messages equal to 4. Once again the RLC protocol outperforms the RMS protocol.

Referring now to both FIGS. 3A and 3B, for the RLC protocol, with n=k=32, the mean dissemination time is around 45 rounds (line 104). Since it is well known that disseminating a single message takes around $\log_2 (n) + \log_2 \log_2 (n) \approx 7$ rounds, disseminating k=32 messages would take around 224 rounds if the messages are disseminated one after the other. Thus, simultaneous dissemination of messages using RLC protocol reduces the time to less than one fourth (also note that the RMS protocol does no better than sequential dissemination). A similar trend can be observed in the case n=32 and k=4. In this case, the mean dissemination time of RLC protocol is around 13 rounds (line 124), whereas, disseminating the messages one after the other would take around 28 rounds. The RLC protocol can provide huge gains in dissemination time even for small number of messages. The RLC protocol comes with a little overhead of $k \log_2 (k)$ additional bits per transmission, which in the regime of k=32 is at most 20 bytes. The typical size of a message is likely to be much larger than this.

An explanation regarding why RLC performs better than RMS is that in RMS, since messages are picked at random, the more messages collected by a node, it is more likely the received message is something it already has. The RLC protocol overcomes this in the following way. In RLC the nodes build up dimension of sub-space spanned by the received code-vectors. The probability that the dimension increases due to a newly received coded message does not go down as the dimension gets closer to k or full-rank.

Figure 4:
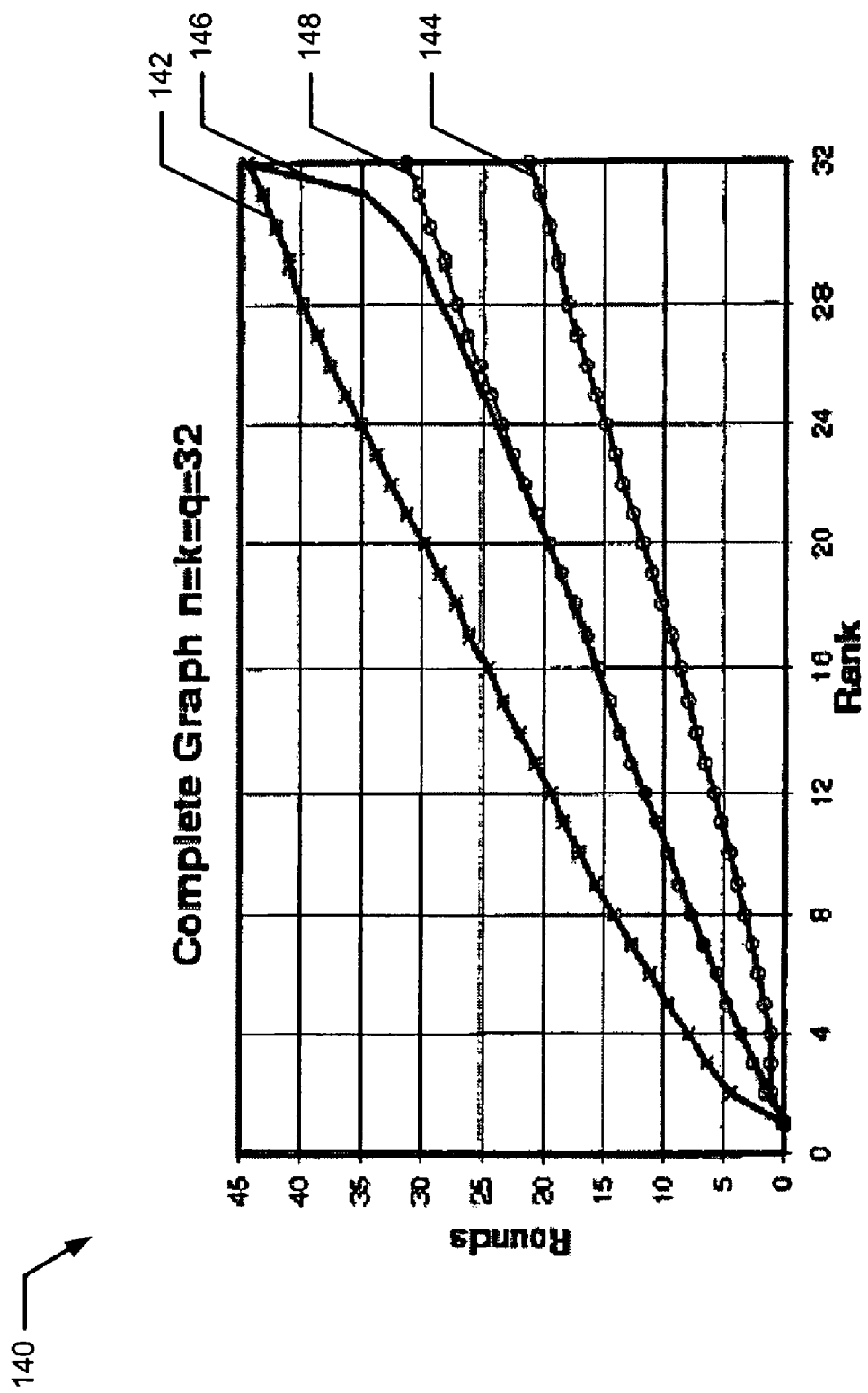
FIG. 4 is a plot showing the time taken for the dimension of the node to increase to different values.

Referring now to FIG. 4, plots are shown for the time taken for the dimension of the various nodes to increase to different values. Plots are shown for nodes that take longest 142, nodes that take least amount of time 144, a sample node 148 and also for a typical node 146.

Figure 5:
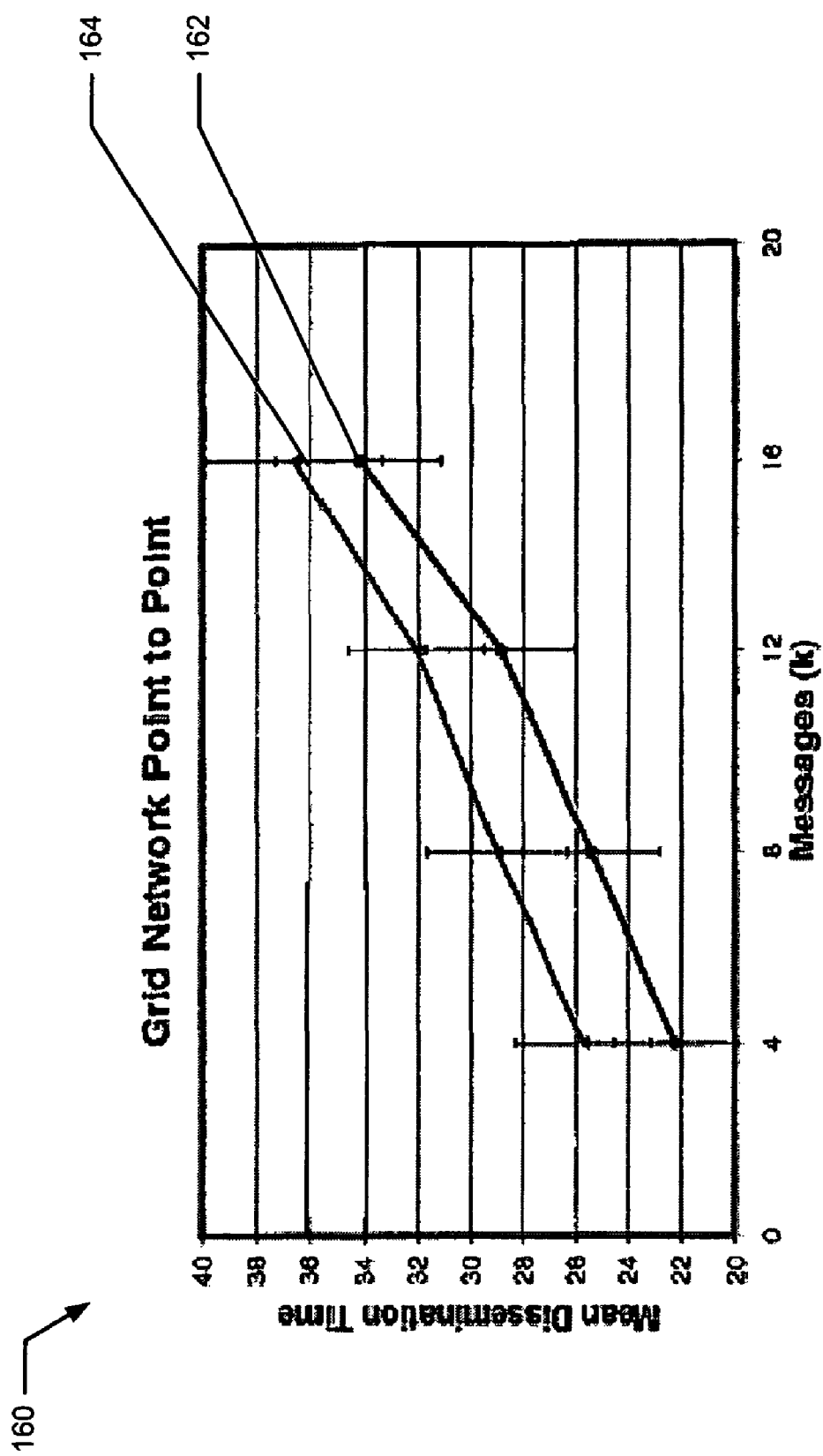
FIG. 5 is a plot showing the dissemination time using the present invention in a grid network.

FIG. 5 shows results with the RLC protocol for a grid network. There are n nodes placed in a square grid with equal spacing. A node at coordinate (ij) has four neighbors: (i−1,j), (i+1,j), (ij−1), (i,j+1) provided there are nodes in those locations (which is the case except for the nodes at the boundary of the square grid). The grid topology is motivated by various wireless scenarios where nodes are placed on a grid. Another related model is where the nodes are placed at random in a geographic region. The two models lead to similar scaling laws for capacity, connectivity and various other properties. The applicability of RLC in the grid network setting is shown, and the benefits should carry over to the case when the nodes are randomly deployed.

Figure 6:
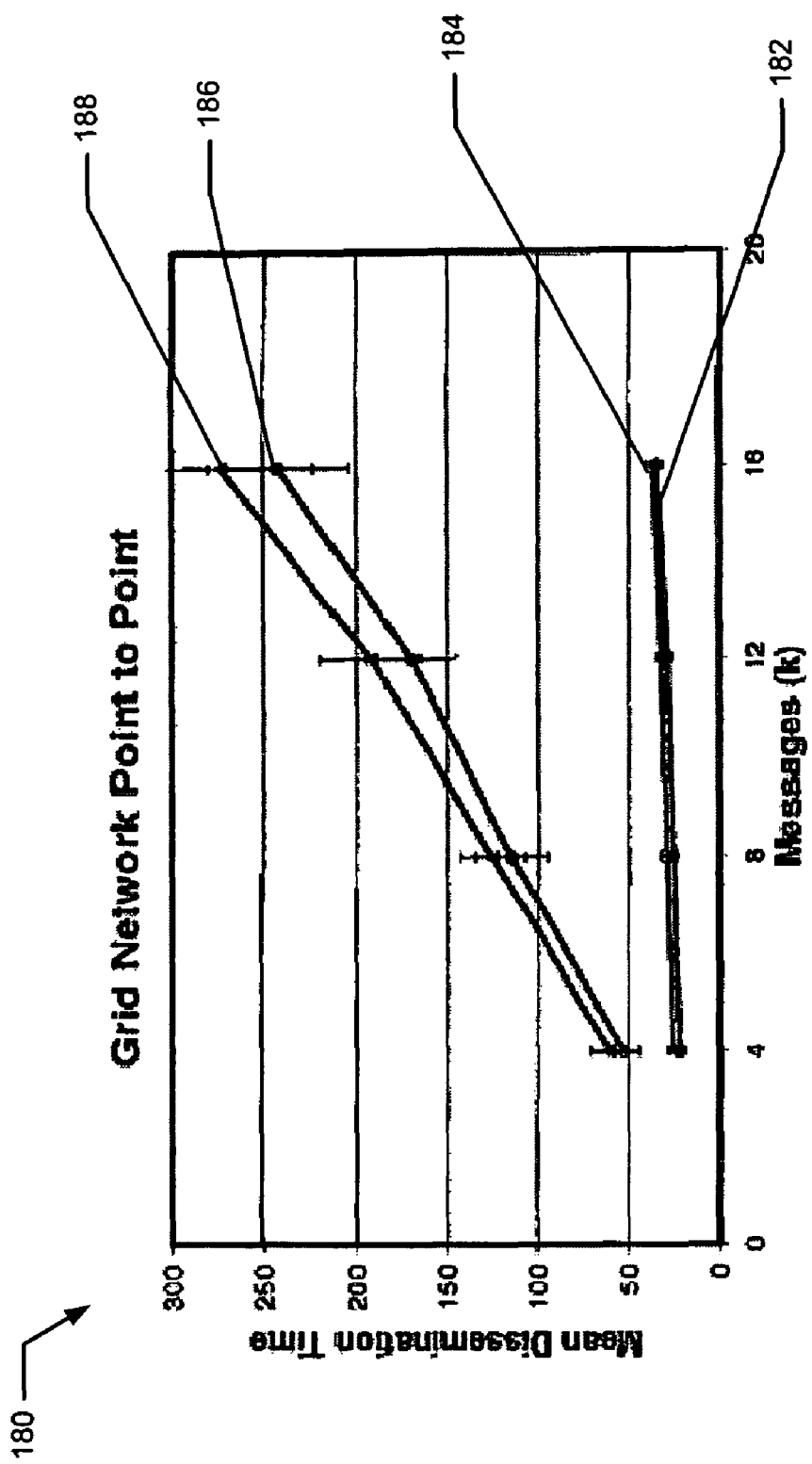
FIG. 6 is a plot showing the dissemination time using the present invention as compared to another type of protocol.

The point to point grid topology may be relevant in a wireless setting where a node establishes a secure link with its neighbors. This ensures that transmitted messages can only be received by the node it is intended for. In FIG. 5 the dissemination time for grids with 36 nodes (line 162) and 49 nodes (line 164) are shown. The system starts with k sources of data/messages. The k sources are at the four corners of the grid. In other words, for any k (multiple of four), k/4 nodes closest to each of the corners of the grid are sources. All the other intermediate nodes do not have any message at round zero. The system progresses in rounds or discrete time-steps. In each round, a node picks up one of its neighbors (one of the four neighbors for any interior node in the grid) at random and transmits a randomly coded message according to the PLC protocol. The dissemination time is shown for various values of k. The gains due to RLC are even more pronounced than the complete graph case. To see this, consider the case with 8 messages and 49 nodes. The source nodes are the four nodes at the four corners of the grid, and another four adjacent to each of the four corner nodes. Thus the messages are wide spread to start with. We can see from plot 164 that RLC takes around 29 rounds for complete dissemination. Disseminating a single message from any corner of the grid will take no less than 14 rounds (since two nodes at diametrically opposite corners are 14 hops away from each other). Thus disseminating them one after the other will take around 112 rounds. Thus RLC provides a huge gain in dissemination time. We also compare the dissemination time with RMS protocol, which maybe a natural protocol for simultaneous dissemination without coding. The comparative plots are shown in FIG. 6. Plot 182 is the RLC protocol with 49 nodes. Plot 184 is the RLC protocol with 36 nodes. Plot 186 is the RMS protocol with 49 nodes. Plot 188 is the RMS protocol with 36 nodes clearly, RLC far outperforms the uncoded RMS protocol. RMS performs as if the messages are disseminated sequentially (using a rough estimate that disseminating a single message can be done in 14 rounds with 49 nodes).

The previous results utilized a gossip based framework, where any transmission by a node can only be heard by a neighbor chosen at random. A different model, where transmissions from a node can be received by all nodes within a certain radius of the transmitting node will now be discussed. The area of coverage of the transmitting node is proportional to the transmission energy. A slotted model is used wherein in each slot, every node gets to transmit once, and further, the transmission can be received by all the nodes within a given radius (which is a parameter in our results). Any effect of interference or collisions are neglected. However, neglecting the interference in this model is not much off the track assumption if the notion of a slot is interpreted a little carefully. In the regime of transmitted energy, it has been shown that, the optimal transmission strategy is bursty (where nodes spend most of the their transmission energy in small intervals, instead of spreading the energy over a large time-intervals) in nature. Thus, if we consider a slot as the interval over which every node gets a chance to transmit, then, the length of a slot corresponds to the period of the transmission-bursts. Thus, each node transmits for a very small length of time in a slot. Transmissions can thus interfere only if the transmission instants of neighboring nodes are synchronized, which is an unlikely event.

Figure 7A:
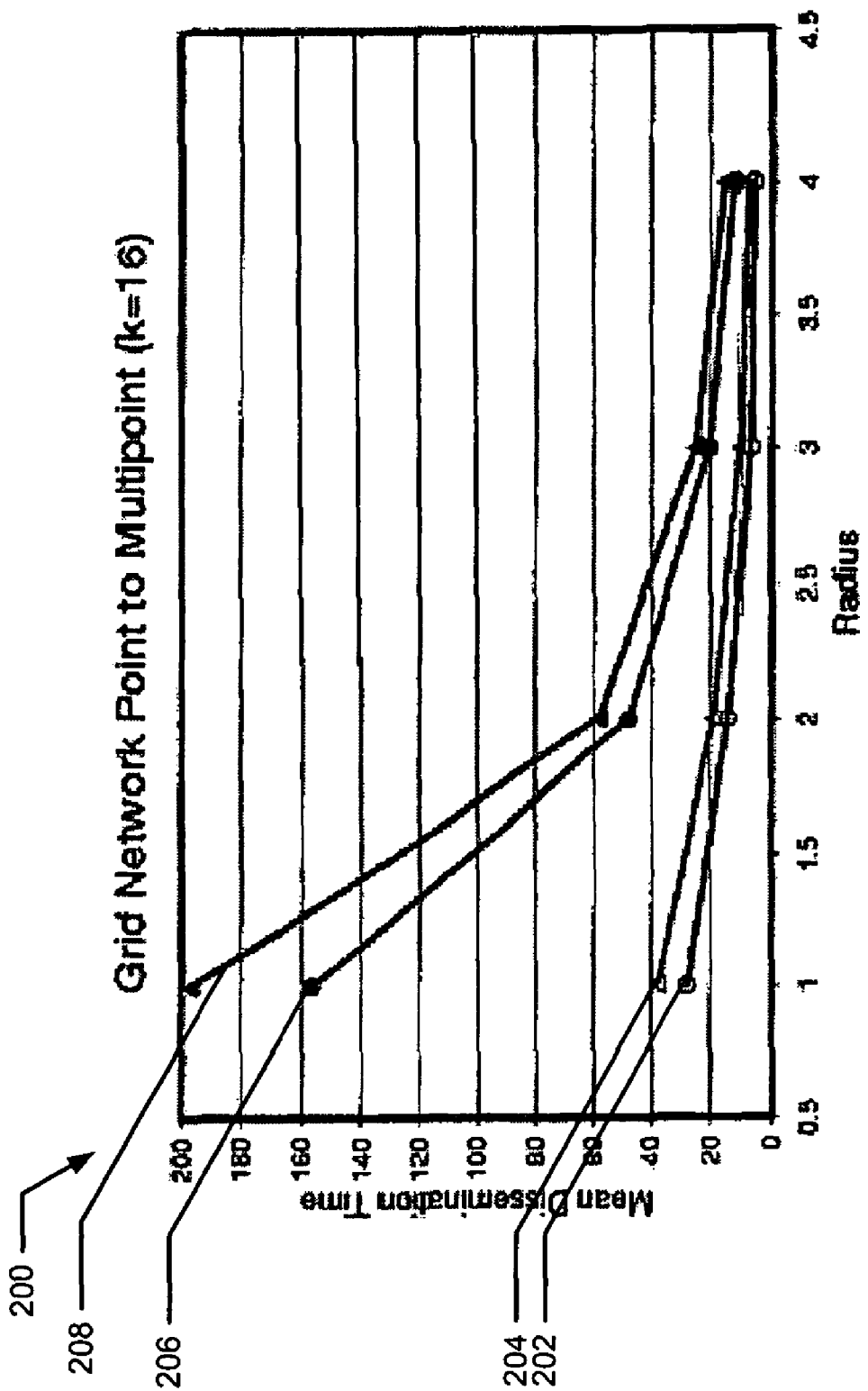
FIG. 7A is a plot showing the mean dissemination time using the present invention in a point-to-multipoint network using 16 messages.
Figure 7B:
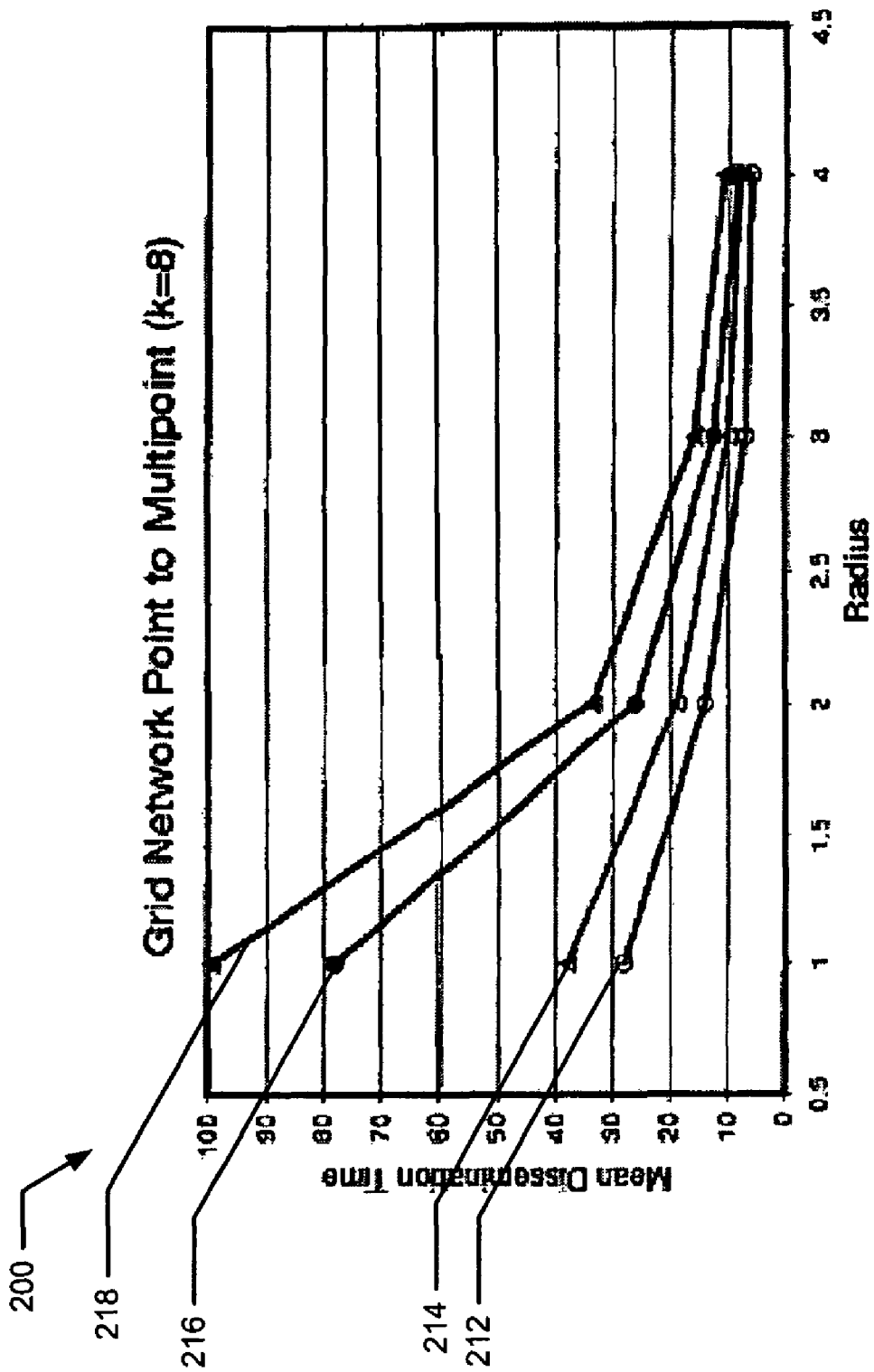
FIG. 7B is a plot showing the mean dissemination time using the present invention using 8 messages.

In FIGS. 7A and 7B, 15×15 and 20×20 square grids with the distance between the two adjacent points in the grid as the unit distance were simulated. In FIGS. 7A and 7B, the dissemination time with RLC and RMS was plotted, for different values of the coverage radius. In FIG. 7A, plot 202 shows the results with RLC in a 15×15 grid. Plot 204 shows the results with RLC in a 20×20 grid. Plot 206 shows the results with RMS in a 15×15 grid. Plot 208 shows the results with RMS in a 20×20 grid. In FIG. 7B, plot 212 shows the results with RLC in a 15×15 grid. Plot 214 shows the results with RLC in a 20×20 grid. Plot 216 shows the results with RMS in a 15×15 grid. Plot 218 shows the results with RMS in a 20×20 grid. Again RLC outperforms RMS.

The dissemination time does not increase with the number of messages. RLC makes every transmission count with a high probability, regardless of the dimension of code-vectors with the node. Thus, for a given node, in one slot, the dimension can increase by as much as the number of potentially helpful nodes (the ones who have subspace of the code-vectors not entirely within that of the given node) within the coverage radius. Thus, with more messages, there are more useful transmissions in one slot. With fewer messages, the number of useful transmission in a slot is more than what is required. Thus, it appears, there are huge gains to be had using simultaneous dissemination in a point-to-multipoint framework. On the other hand, RMS cannot make every transmission count, especially when the number of received messages is close to the number of messages being disseminated. Thus, it cannot take advantage of the point-to-multipoint nature of transmission.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method using network coding to provide rapid information dissemination, the method comprising:
   transmitting, from a first node of the network to a second node of the network, a coded message including a payload; and
transmitting, from the first node to the second node of the network, a random code vector with said message, wherein said random code vector is calculated according to the equation $$\Pr(\beta_l = \beta) = \frac{1}{q} \forall \beta \in F_q$$

wherein Pr is said random code vector, wherein $\beta$ is a coding vector, and
wherein $F_q$ is a finite field of size q where q is a number of messages.

2. The method of claim 1 wherein said payload of said message is calculated in accordance with the equation $$e = \sum_{fl=1}^{|S_1|} \beta_i f_l$$

wherein e is the payload, $\beta$ is a coding vector, and f is an element within a peer.

3. The method of claim 1 wherein said message is constructed by appending the code vector to the payload.

4. The method of claim 1 wherein said transmitting is done using a gossip-based protocol.

5. The method of claim 1 further comprising retrieving the information.

6. The method of claim 5 wherein said retrieving the information comprises:
   collecting code vectors from at least one peer;
   viewing collected code vectors as a matrix;
   determining whether a dimension of the matrix is equal to a predefined number, and when the dimension of the matrix does not equal the predefined number then repeating said collecting, said viewing and said determining; and
   when the dimension of the matrix equals the predefined number, then retrieving said information using the collection of code vectors in the matrix.

7. The method of claim 6 wherein said viewing collected code vectors as a matrix comprises viewing said collected code vectors as a n×k matrix wherein n is the number of coded messages and k is the total number of messages.

8. The method of claim 7 wherein determining comprises determining when the dimension of the matrix is equal to the number of messages to be disseminated.

9. A computer implemented method of retrieving information comprising:
   collecting, by a computer, code vectors from at least one peer, wherein said code vectors were calculated according to the equation $$\Pr(\beta_l = \beta) = \frac{1}{q} \forall \beta \in F_q$$

wherein Pr is said random code vector, wherein $\beta$ is a coding vector, and
   wherein $F_q$ is a finite field of size q where q is a number of messages;
   viewing, by said computer, collected code vectors as a matrix;
   determining, by said computers, whether a dimension of the matrix is equal to a predefined number, and when the dimension of the matrix does not equal the predefined number then repeating said collecting, said viewing and said determining; and
   when the dimension of the matrix equals the predefined number, then retrieving, by said computer, said information using the collection of code vectors in the matrix.

10. The method of claim 9 wherein said viewing collected code vectors as a matrix comprises viewing said collected code vectors as a n×k matrix wherein n is the number of coded messages and k is the total number of messages.

11. The method of claim 9 wherein determining comprises determining when the dimension of the matrix is equal to the number of messages to be disseminated.

12. A non-transitory computer readable medium having computer readable code thereon for providing rapid information dissemination using network coding, the medium comprising:
   instructions for transmitting, from a first node of the network to a second node of the network, a coded message including a payload; and
   instructions for transmitting, from the first node to the second node of the network, a random code vector with said message, wherein said random code vector is calculated according to the equation $$\Pr(\beta_l = \beta) = \frac{1}{q} \forall \beta \in F_q$$

wherein Pr is said random code vector, wherein $\beta$ a coding vector, and wherein $F_q$ is a finite field of size q where q is a number of messages.

13. The computer readable medium of claim 12 including instructions for calculating said payload of said message in accordance with the equation $$e = \sum_{\beta=1}^{|S_1|} \beta_i f_i$$

wherein e is the payload, β a coding vector, and f is an element within a peer.

14. The computer readable medium of claim 12 including instructions for constructing said message by appending the code vector to the payload.

15. The computer readable medium of claim 12 wherein said instructions for transmitting comprises instructions for transmitting using a gossip-based protocol.

16. The computer readable medium of claim 12 further comprising instructions for retrieving the information.

17. The computer readable medium of claim 16 wherein said retrieving the information comprises:
   instructions for collecting code vectors from at least one peer;
   instructions for viewing collected code vectors as a matrix;
   instructions for determining whether a dimension of the matrix is equal to a predefined number, and when the dimension of the matrix does not equal the predefined number then repeating said collecting, said viewing and said determining; and
   instructions for when the dimension of the matrix equals the predefined number, then retrieving said information using the collection of code vectors in the matrix.

18. The computer readable medium of claim 17 wherein said instructions for viewing collected code vectors as a matrix comprises instructions for viewing said collected code vectors as a n×k matrix wherein n is the number of coded messages and k is the total number of messages.

19. The computer readable medium of claim 18 wherein said instructions for determining comprises instructions for determining when the dimension of the matrix is equal to the number of messages to be disseminated.

20. A non-transitory computer readable medium of retrieving information comprising:
   instructions for collecting code vectors from at least one peer, wherein said code vector was calculated according to the equation $$\Pr(\beta_l = \beta) = \frac{1}{q} \forall \beta \in F_q$$

wherein Pr is said random code vector, wherein β is a coding vector, and wherein $F_q$ is a finite field of size q where q is a number of messages.;
   instructions for viewing collected code vectors as a matrix;
   instructions for determining whether a dimension of the matrix is equal to a predefined number, and when the dimension of the matrix does not equal the predefined number then repeating said collecting, said viewing and said determining; and
   instructions for when the dimension of the matrix equals the predefined number, then retrieving said information using the collection of code vectors in the matrix.

21. The computer readable medium of claim 20 wherein said instructions for viewing collected code vectors as a matrix comprises instructions for viewing said collected code vectors as a n×k matrix wherein n is the number of coded messages and k is the total number of messages.

22. The computer readable medium of claim 20 wherein said instructions for determining comprises instructions for determining when the dimension of the matrix is equal to the number of messages to be disseminated.

* * * * *